(12) United States Patent
Takahashi et al.

(10) Patent No.: US 11,088,976 B2
(45) Date of Patent: Aug. 10, 2021

(54) INFORMATION PROCESSING SYSTEM CAPABLE OF PROMOTING COMMUNICATION BETWEEN/AMONG USERS, INFORMATION PROCESSING APPARATUS, NON-TRANSITORY STORAGE MEDIUM ENCODED WITH COMPUTER READABLE PROGRAM, AND METHOD OF CONTROLLING INFORMATION PROCESSING APPARATUS

(71) Applicant: NINTENDO CO., LTD., Kyoto (JP)

(72) Inventors: Ryutaro Takahashi, Kyoto (JP); Hayuru Soma, Kyoto (JP); Kazuki Yoshihara, Kyoto (JP); Ginga Kamei, Kyoto (JP); Masayuki Okada, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 1030 days.

(21) Appl. No.: 15/061,159

(22) Filed: Mar. 4, 2016

(65) Prior Publication Data
US 2017/0048173 A1 Feb. 16, 2017

(30) Foreign Application Priority Data
Aug. 14, 2015 (JP) .............................. JP2015-160050

(51) Int. Cl.
*H04L 12/58* (2006.01)
*H04M 1/72427* (2021.01)
(Continued)

(52) U.S. Cl.
CPC ............ *H04L 51/10* (2013.01); *H04L 51/046* (2013.01); *H04M 1/72427* (2021.01); *H04M 1/72436* (2021.01); *H04M 1/72433* (2021.01)

(58) Field of Classification Search
CPC .. G06F 3/0482; G06F 3/04842; G06F 3/0481; G06F 3/04817; H04L 67/306
See application file for complete search history.

(56) References Cited

U.S. PATENT DOCUMENTS

2002/0087555 A1  7/2002  Murata
2008/0155080 A1* 6/2008  Marlow ................. H04L 12/66
                                                     709/223
(Continued)

FOREIGN PATENT DOCUMENTS

JP     2002-366474    12/2002
JP     2003-122554     4/2003
(Continued)

*Primary Examiner* — Ninos Donabed
(74) *Attorney, Agent, or Firm* — Nixon & Vanderhye P.C.

(57) ABSTRACT

A first information processing apparatus includes a first message acceptance unit which accepts input of a first message and a first message transmission unit which transmits the accepted first message and first character information to a server. A second information processing apparatus includes a second message acceptance unit which accepts input of a second message and a second message transmission unit which transmits the accepted second message and second character information to the server. The first information processing apparatus further includes a representation output unit which has a display unit display in chronological order, the first message brought in correspondence with a first character based on the first character information and the second message brought in correspondence with a second character based on the second character information obtained through the server and a reproduction output unit which provides audio output of the first message and the second message.

20 Claims, 22 Drawing Sheets

(51) Int. Cl.
*H04M 1/72436* (2021.01)
*H04M 1/72433* (2021.01)

(56) References Cited

U.S. PATENT DOCUMENTS

| | | | |
|---|---|---|---|
| 2009/0177969 A1* | 7/2009 | Jones | G06N 3/006 |
| | | | 715/730 |
| 2014/0111689 A1 | 4/2014 | Kim et al. | |
| 2015/0081788 A1 | 3/2015 | Takuma | |
| 2015/0121251 A1* | 4/2015 | Kadirvel | H04M 1/72544 |
| | | | 715/753 |
| 2015/0121256 A1 | 4/2015 | Kim | |
| 2015/0215249 A1 | 7/2015 | Bruns-Bielkowicz et al. | |

FOREIGN PATENT DOCUMENTS

| | | |
|---|---|---|
| JP | 2003-271532 | 9/2003 |
| JP | 2005-4377 | 1/2005 |
| JP | 2005-276103 | 10/2005 |
| JP | 2013-178723 | 9/2013 |
| JP | 2014-86088 | 5/2014 |
| JP | 2015-056127 | 3/2015 |
| JP | 2015-514273 | 5/2015 |

* cited by examiner

FIG.5

| TERMINAL ID | USER NAME | CHARACTER | FRIEND CHARACTER |
|---|---|---|---|
| T1 | USER P | A | B, C ··· |
| T2 | USER Q | B | A, C ··· |
| T3 | USER R | C | A, B ··· |
| ⋮ | ⋮ | ⋮ | ⋮ |

| FACE | EMOTION | CHARACTER |
|---|---|---|
| 😊 | SMILE | HAPPY, FUN, GOOD |
| 😠 | ANGER | SAD, SORRY |
| 😐 | NORMAL | |
| ⋮ | ⋮ | ⋮ |

| a | e | i | . . . . . . | n |
|---|---|---|---|---|
| C | B | B |   | A |

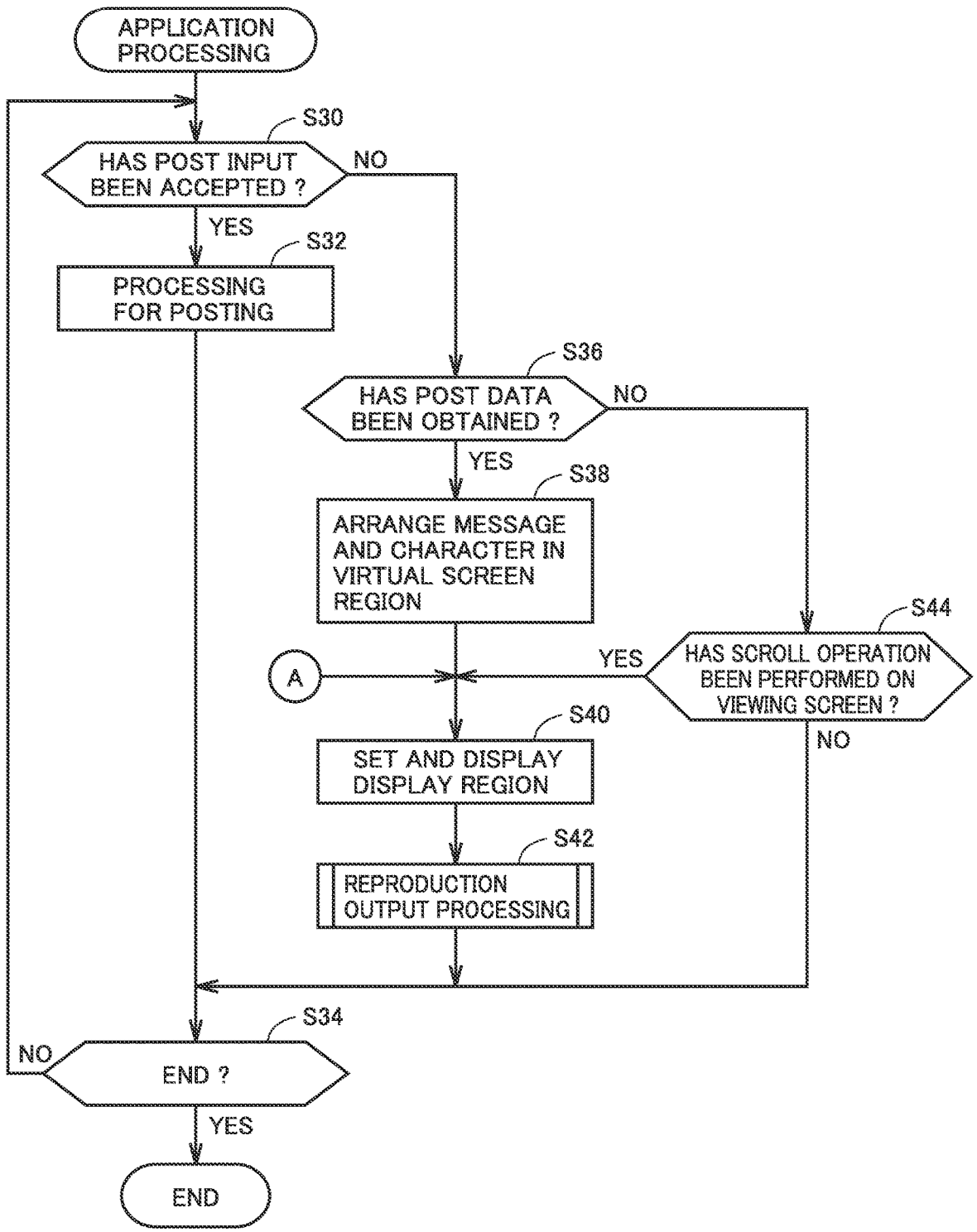

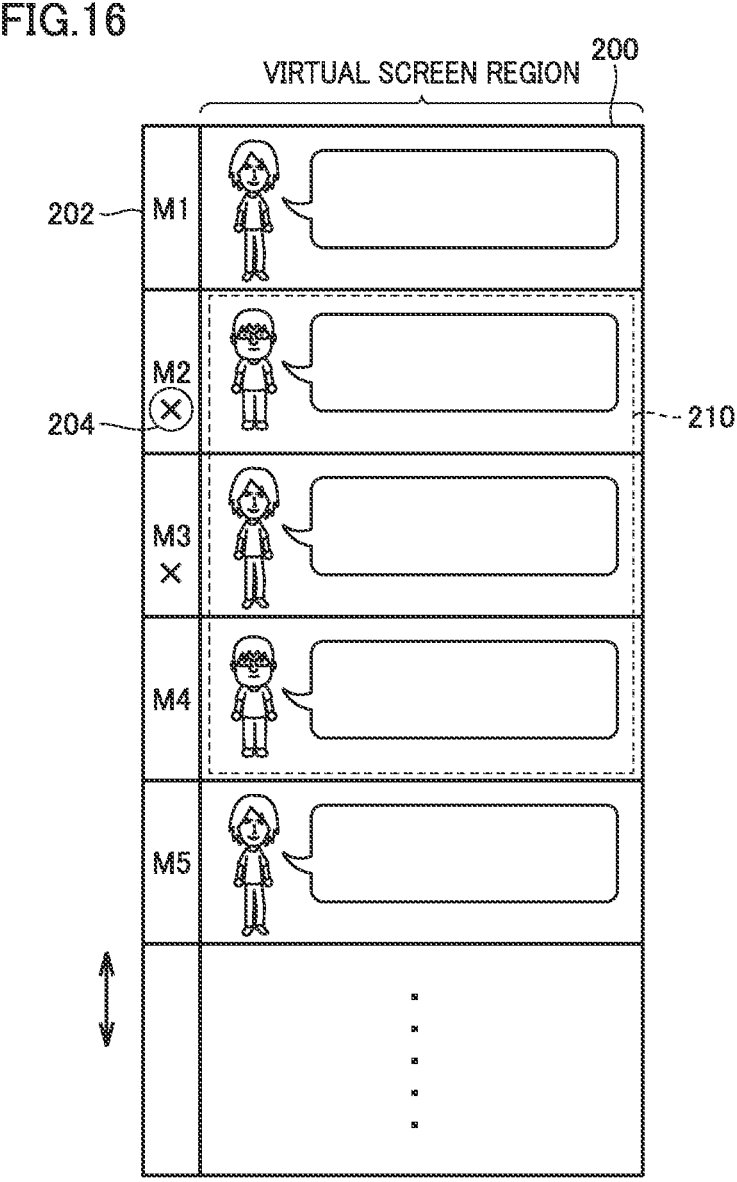

INFORMATION PROCESSING SYSTEM CAPABLE OF PROMOTING COMMUNICATION BETWEEN/AMONG USERS, INFORMATION PROCESSING APPARATUS, NON-TRANSITORY STORAGE MEDIUM ENCODED WITH COMPUTER READABLE PROGRAM, AND METHOD OF CONTROLLING INFORMATION PROCESSING APPARATUS

This nonprovisional application is based on Japanese Patent Application No. 2015-160050 filed with the Japan Patent Office on Aug. 14, 2015, the entire contents of which are hereby incorporated by reference.

FIELD

The present disclosure relates to an information processing system in which information terminals can communicate data.

BACKGROUND AND SUMMARY

Portable information terminals such as smartphones have recently widely been used. Opportunities for a user to make use of various network services with the use of such a portable information terminal have increased.

In addition, what is called social network service (SNS) has also become prevalent. The SNS can be made use of not only through personal computers but also through portable information terminals, and among SNSs, SNS made use of only through portable information terminals is also provided. In fact, more users enjoy an SNS with portable information terminals. With such an SNS, users can view posts among one another.

According to the technique above, however, a user who has made a post and contents of the post including characters or images are merely displayed as being tied with each other, and there has been a room for improvement in diversifying expressions in communication and promoting communication between/among users.

An object of the present disclosure is to provide an information processing system capable of promoting communication between/among users, an information processing apparatus, a non-transitory storage medium encoded with a computer readable program, and a method of controlling an information processing apparatus.

An information processing system in which a plurality of information processing apparatuses can communicate data through a server according to one aspect, a first information processing apparatus includes a first message acceptance unit which accepts input of a first message input by a user who operates the first information processing apparatus and a first message transmission unit which transmits the accepted first message and first character information to the server. A second information processing apparatus includes a second message acceptance unit which accepts input of a second message input by a user who operates the second information processing apparatus and a second message transmission unit which transmits the accepted second message and second character information to the server. The first information processing apparatus further includes a representation output unit which has a display unit display in chronological order, the first message brought in correspondence with a first character based on the first character information and the second message brought in correspondence with a second character based on the second character information obtained through the server and a reproduction output unit which provides audio output of the first message and the second message.

In the exemplary embodiment, the reproduction output unit may perform processing for displaying a character based on a result of analysis of contents of at least any of the first message and the second message and corresponding character information.

In the exemplary embodiment, the reproduction output unit may perform processing for displaying the character based on the result of analysis and the corresponding character information while audio output of the first message and the second message is provided.

In the exemplary embodiment, the reproduction output unit may perform processing for displaying at least any of the first message and the second message based on a result of analysis of contents of at least any of the first message and the second message.

In the exemplary embodiment, the reproduction output unit may provide audio output of at least any of the first message and the second message based on a result of analysis of contents of at least any of the first message and the second message.

In the exemplary embodiment, the result of analysis may be a result of analysis for each divided unit resulting from division of contents of at least any of the first message and the second message into prescribed units.

In the exemplary embodiment, messages displayed in chronological order on the display unit are provided such that scroll display of the messages can be provided in response to an operation by a user, and the reproduction output unit may determine whether or not the first or second message is displayed in a screen on the display unit and successively provide audio output of the message displayed in the screen.

In the exemplary embodiment, the character may be an avatar representing the user.

In the exemplary embodiment, the reproduction output unit may provide animated representation of the avatar.

In the exemplary embodiment, the reproduction output unit may provide animated representation of the avatar by selecting one of a plurality of operation patterns.

In the exemplary embodiment, the reproduction output unit may sequentially provide audio output of the messages displayed in chronological order on the display unit.

In the exemplary embodiment, the reproduction output unit may sequentially and repeatedly provide audio output of the messages displayed in chronological order on the display unit.

In the exemplary embodiment, the reproduction output unit may provide scroll display of messages not displayed on the display unit and sequentially and repeatedly provide audio output of the messages of which scroll display is provided.

In the exemplary embodiment, the reproduction output unit may obtain a result of analysis of message contents obtained through the server, which corresponds to a reproduction position in audio output of the message.

In the exemplary embodiment, the reproduction output unit may perform processing for displaying the message based on the obtained result of analysis.

In the exemplary embodiment, the reproduction output unit may perform processing for displaying a character based on the obtained result of analysis and corresponding character information.

An information processing system in which a plurality of information processing apparatuses can communicate data through a server according to one aspect, a first information processing apparatus includes a first message acceptance unit which accepts input of a first message input by a user who operates the first information processing apparatus and a first message transmission unit which transmits the accepted first message and first character information to the server. A second information processing apparatus includes a second message acceptance unit which accepts input of a second message input by a user who operates the second information processing apparatus and a second message transmission unit which transmits the accepted second message and second character information to the server. The first information processing apparatus further includes a representation output unit which has a display unit display in chronological order, the first message brought in correspondence with a first character based on the first character information and the second message brought in correspondence with a second character based on the second character information obtained through the server and a reproduction output unit which performs reproduction processing based on a result of analysis of contents of the first and second messages.

An information processing apparatus capable of communicating data with another information processing apparatus through a server according to one aspect includes a message acceptance unit which accepts input of a first message input by a user who operates the information processing apparatus, a message transmission unit which transmits the accepted first message and first character information to the server, a representation output unit which has a display unit display in chronological order, a first character based on the first character information brought in correspondence with the first message, and a second message and a second character based on second character information, which have been input from another information processing apparatus and obtained through the server, and an audio output unit which provides audio output of the first message and the second message.

A non-transitory storage medium encoded with a computer readable program executed by a computer of an information processing apparatus capable of communicating data with another information processing apparatus through a server according to one aspect, the program causes the computer of the information processing apparatus to function as a message acceptance unit which accepts input of a first message input by a user who operates the information processing apparatus, a message transmission unit which transmits the accepted first message and first character information to the server, a representation output unit which has a display unit display in chronological order, a first character based on the first character information brought in correspondence with the first message, and a second message and a second character based on second character information, which have been input from another information processing apparatus and obtained through the server, and an audio output unit which provides audio output of the first message and the second message.

A method of controlling an information processing apparatus capable of communicating data with another information processing apparatus through a server according to one aspect includes the steps of accepting input of a first message input by a user who operates the information processing apparatus, transmitting the accepted first message and first character information to the server, displaying in chronological order on a display unit, a first character based on the first character information brought in correspondence with the first message, and a second message and a second character based on second character information, which have been input from another information processing apparatus and obtained through the server, and providing audio output of the first message and the second message.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 5 is a diagram illustrating data stored in an association information storage 44 based on the embodiment.

FIGS. 14A and 14B are diagrams illustrating processing (No. 2) for analyzing a message based on the embodiment.

FIG. 15 is a flowchart illustrating application processing in terminal 2 based on the embodiment.

FIG. 16 is a diagram illustrating setting of a virtual screen region and a display region based on the embodiment.

DETAILED DESCRIPTION OF NON-LIMITING EXAMPLE EMBODIMENTS

Figure 1:
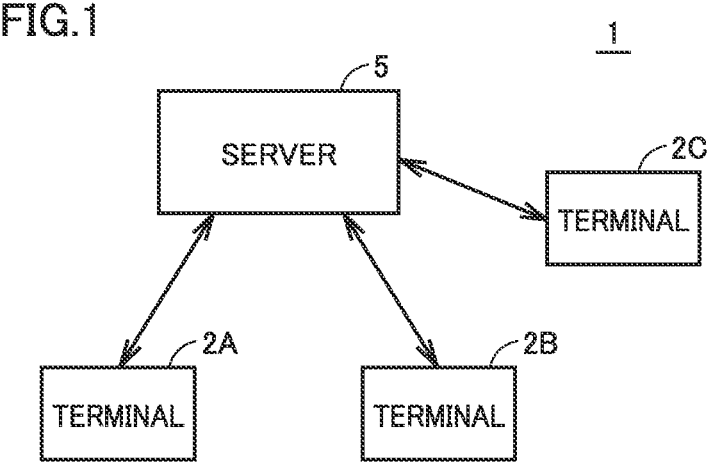
FIG. 1 is a diagram showing a configuration of one example of an information processing system based on an embodiment.

This embodiment will be described in detail with reference to the drawings. The same or corresponding elements in the drawings have the same reference characters allotted and description thereof will not be repeated.

First Embodiment

Configuration of Information Processing System

FIG. 1 is a diagram showing a configuration of one example of an information processing system based on an embodiment.

As shown in FIG. 1, an information processing system 1 includes a server 5 and a plurality of terminals 2A to 2C. Terminals 2A to 2C are provided to be able to communicate with server 5 and can communicate data with other terminals through server 5.

Terminals 2A to 2C are any information processing apparatuses which can communicate data. In the present embodiment, terminals 2A to 2C may be, for example, a portable (also referred to as mobile) device such as a portable game device, a portable telephone, or a smartphone, a stationary device such as a personal computer or a home game console, or a large apparatus such as an arcade game machine.

Server 5 is any information processing apparatus capable of communicating data with terminals 2A to 2C.

Though terminals 2A to 2C are described in the present example, limitation to that number of terminals is not particularly intended, and more terminals can also be provided so long as the number is two or more.

A configuration of terminals 2A to 2C (hereinafter also collectively referred to as terminal 2) will be described below.

Figure 2:
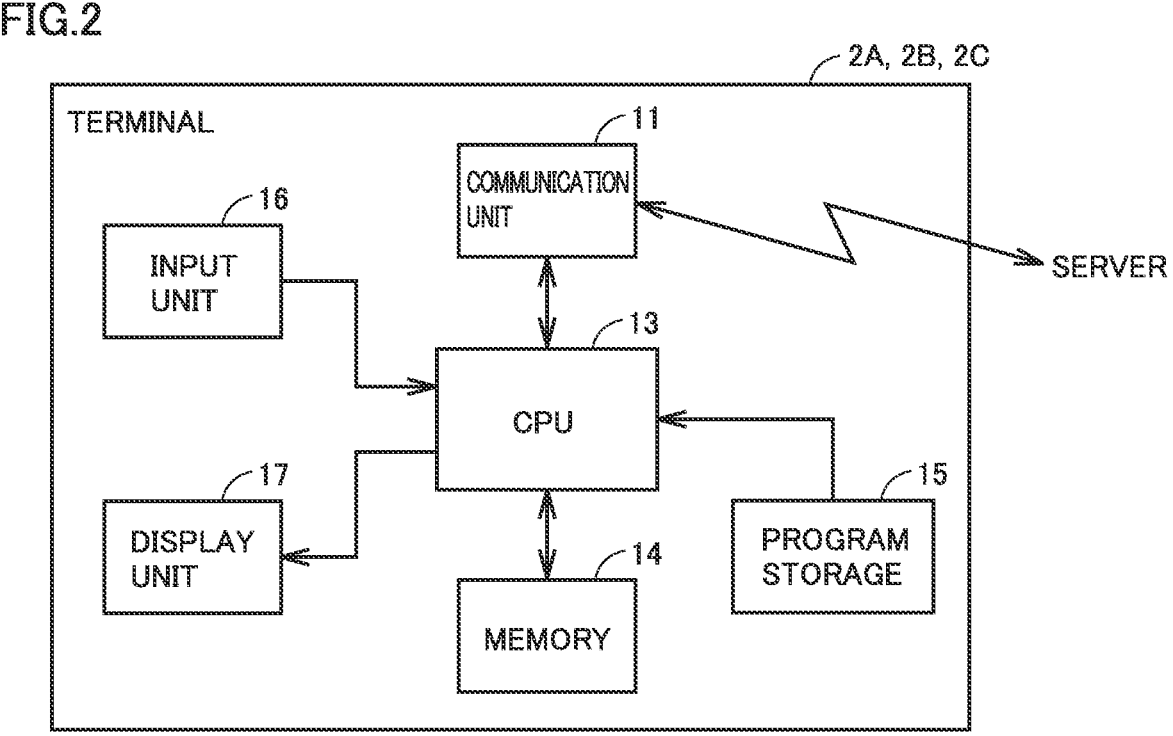
FIG. 2 is a diagram illustrating a configuration of a terminal 2 based on the embodiment.

FIG. 2 is a diagram illustrating a configuration of terminal 2 based on the embodiment.

As shown in FIG. 2, terminal 2 includes a communication unit 11, a CPU 13, a memory 14, a program storage 15, an input unit 16, and a display unit 17. CPU 13 is an information processing unit for performing various types of information processing performed in terminal 2. CPU 13 performs the various types of information processing with the use of memory 14. Program storage 15 stores various programs (including a communication program and an application program) executed in terminal 2. Program storage 15 is any storage device (storage medium) which can be accessed by CPU 13. Program storage 15 may be implemented, for example, by a storage contained in terminal 2 such as a hard disk or a memory, a storage medium which can be attached to or removed from terminal 2 such as an optical disc or a cartridge, or both of the storage and the storage medium.

In the present embodiment, in terminal 2, at least two types of programs of an application program and a communication program are stored in program storage 15.

An application program is a program for executing any application. The application program may be, for example, a game program performing game processing using game data by reading the game data.

A communication program is a program for data communication with server 5. For example, a communication program has communication unit 11 perform an operation for communication in response to a command from an application.

Input unit 16 is implemented as a button or a touch panel and accepts an instruction from a user.

Display unit 17 displays an image generated through information processing.

Terminal 2 may be implemented by a plurality of apparatuses. For example, terminal 2 may be configured in such a manner that an apparatus including communication unit 11 is removably connected to an apparatus including CPU 13 and memory 14. Terminal 2 may be implemented by a main body apparatus having CPU 13 and an apparatus having input unit 16 and/or display unit 17, which are separate from each other. For example, in another embodiment, terminal 2 may be implemented by a main body apparatus and a terminal apparatus having input unit 16 and display unit 17, or by a main body apparatus and an operation apparatus having input unit 16. Terminal 2 may employ a television as a display apparatus, without including display unit 17.

In another embodiment, at least a part of information processing performed in terminal 2 may be performed as distributed among a plurality of apparatuses capable of communicating over a network (a wide area network and/or a local network).

Figure 3:
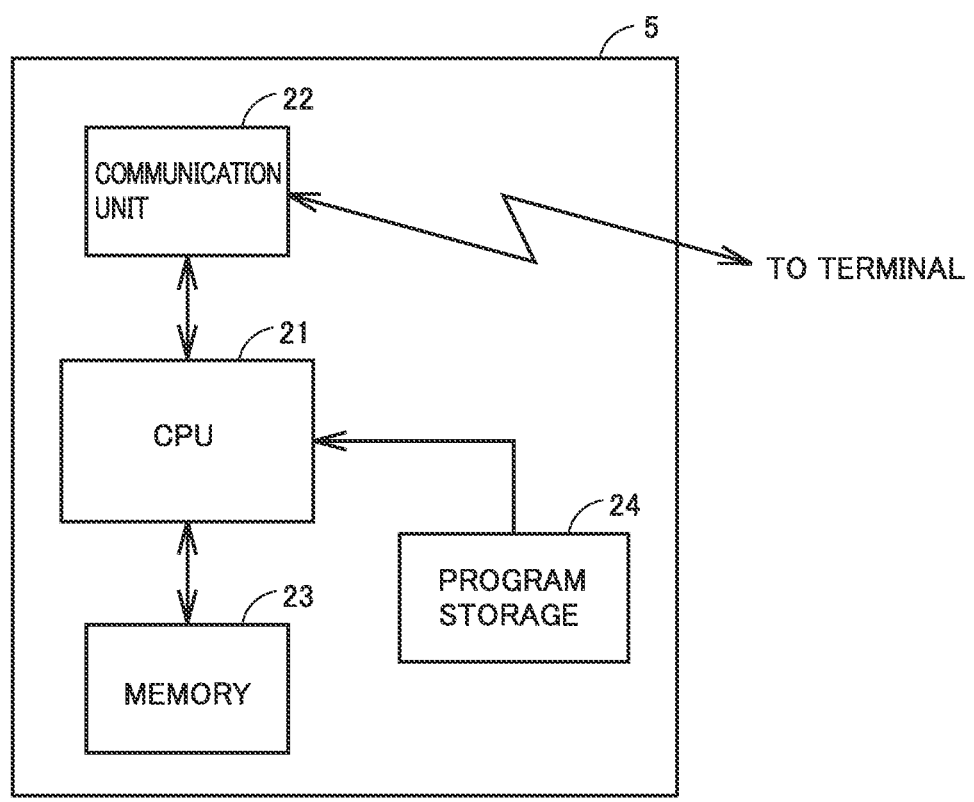
FIG. 3 is a diagram illustrating a configuration of a server 5 based on the embodiment.

FIG. 3 is a diagram illustrating a configuration of server 5 based on the embodiment.

Referring to FIG. 3, server 5 includes a communication unit 22, a CPU 21, a memory 23, and a program storage 24. Since each function is basically the same as described in connection with terminal 2, detailed description thereof will not be repeated. Though an input unit and a display unit are not provided, an input unit and a display unit can also be provided.

<Functional Block Configuration>

Figure 4:
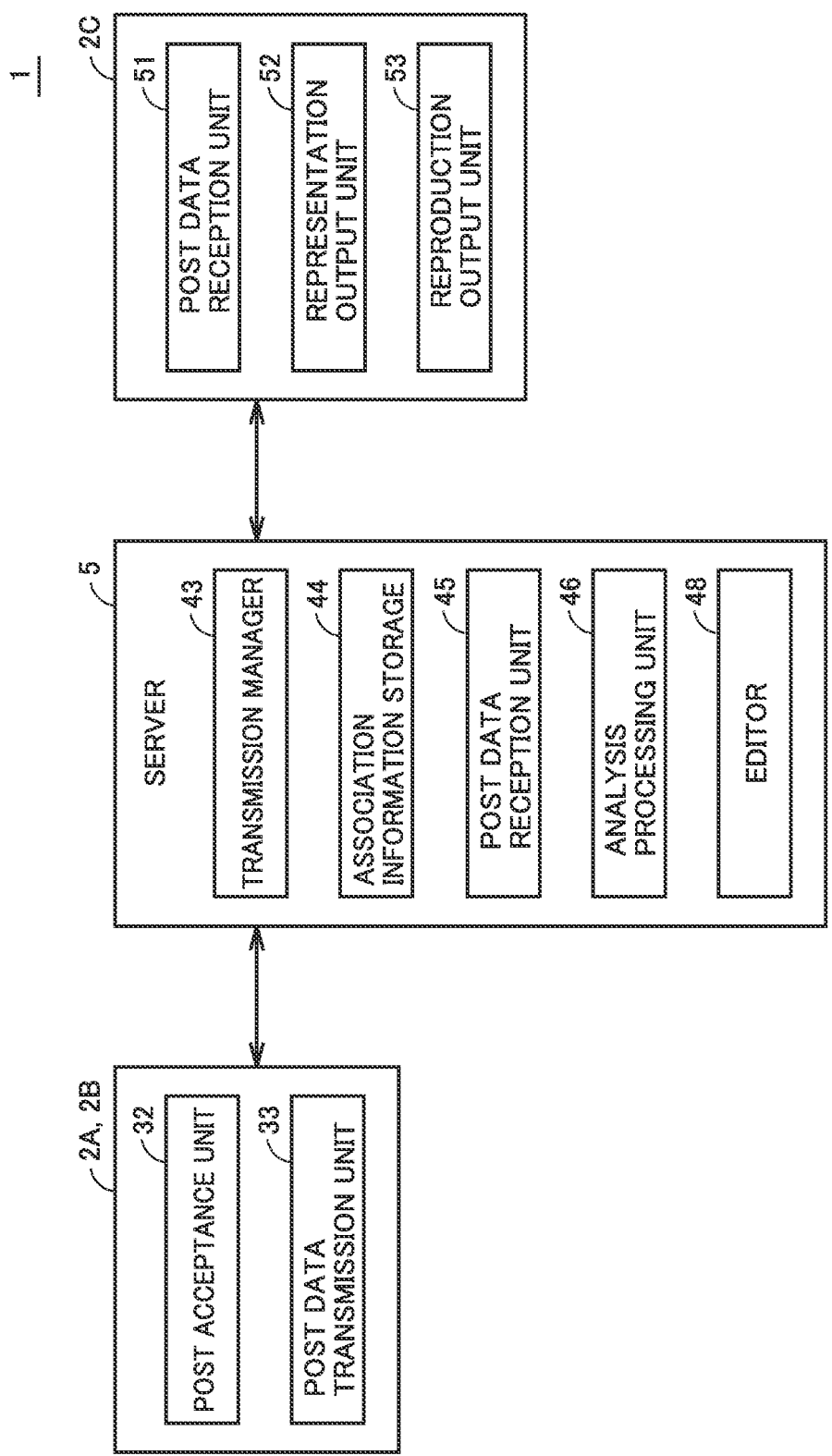
FIG. 4 is a diagram illustrating each functional block configuration of an information processing system 1 based on the embodiment.

FIG. 4 is a diagram illustrating each functional block configuration of information processing system 1 based on the embodiment.

As shown in FIG. 4, by way of example, a configuration of functional blocks of terminals 2A, 2B, and 2C and server 5 is shown. In the present example, data communication among terminals 2A, 2B, and 2C through server 5 will be described. Specifically, a network service with which users post messages and can view posted messages among them will be described by way of example.

Terminals 2A and 2B will be described here, with a functional block for performing processing for posting a message being assumed as the same.

Terminal 2C will be described as a functional block performing processing for viewing a posted message.

For the sake of brevity of description in the present example, a case that functions of terminals 2A and 2B and functions of terminal 2C are different from each other is described, however, each terminal 2 can perform processing for posting a message and a processing for viewing a posted message and each terminal has both of the functions of terminals 2A and 2B and the functions of terminal 2C.

The functional block of terminals 2A, 2B, and 2C is implemented as CPU 13 of terminal 2 executes a program stored in program storage 15 in cooperation with each unit.

The functional block of server 5 is implemented as CPU 21 of server 5 executes a program stored in program storage 24 in cooperation with each unit.

Terminals 2A and 2B each include a post acceptance unit 32 and a post data transmission unit 33.

Post acceptance unit 32 accepts an instruction for posting any message from a user for the purpose of using a network service.

Post data transmission unit 33 transmits a message accepted by post acceptance unit 32 to server 5 as post data. At this time point, post data transmission unit 33 transmits to server 5, together with the message, character association information associated with a character associated with a user, as being included in the post data.

The character is a character associated with a user of terminal 2A or terminal 2B. The character is an avatar representing a user.

A program stored in program storage 15 of each terminal 2 includes a generation program for generating a character made use of by a user of each terminal 2, and the user of each terminal 2 generates in advance a character he/she uses by means of the generation program. Then, as the character is generated, a character ID uniquely specifying the character is issued. Each terminal 2 can form a character based on information associated with the character (character ID) and display and output the character.

The information associated with the character (which is also referred to as character-association information) is data for specifying a character, and in the present example, by way of example, it is described as the character ID. Detailed data of each part or a part ID representing each part may be included as character data necessary for configuring a character, together with the character ID.

Memory 14 of each terminal 2 stores generated character association information (by way of example, a character ID).

A program stored in program storage 15 of each terminal 2 includes a friend registration program, and the user of each terminal 2 registers a friend with which a group is formed as necessary by means of the friend registration program.

There are various schemes for a friend registration scheme, and for example, a friend may be registered by exchanging information through infrared communication. Alternatively, a server may be made use of. For example, a friend can also be registered when a server recognizes that users face each other based on position information by making use of a global positioning system (GPS) function provided in each terminal 2. Alternatively, users who have already been friends through social networking service (SNS) can be displayed on each terminal 2 as "maybe friend" and a friend can also be registered after processing for registration application and approval. Alternatively, a friend registration program allowing friend registration by exchanging a prescribed code (a friend code) predetermined for each terminal 2 between users and entering the exchanged code is included, so that the user of each terminal 2 registers a friend with which a group is formed as necessary by means of the friend registration program.

Information on each terminal 2 (a user name, a character ID, and friend relation) is transmitted to server 5 and managed by server 5. In the present example, the information is stored in an association information storage 44 which will be described later.

Terminal 2C includes a post data reception unit 51, a representation output unit 52, and a reproduction output unit 53.

Post data reception unit 51 receives post data through server 5.

Representation output unit 52 performs processing for displaying and outputting a message based on the post data received through server 5.

Reproduction output unit 53 performs processing for reproducing and outputting (for example, providing audio output of) a message based on the post data received through server 5.

Server 5 includes a transmission manager 43, association information storage 44, a post data reception unit 45, an analysis processing unit 46, and an editor 48.

Association information storage 44 stores each terminal provided to be able to communicate with server 5 and association information representing relation between a terminal and another terminal. Specifically, association information storage 44 stores information on a user who makes use of each terminal and on a character made use of by the user. Association information storage 44 includes also information on another terminal registered as a friend for each terminal (a character corresponding to another terminal).

Post data reception unit 45 receives post data transmitted from each terminal.

Analysis processing unit 46 performs analysis processing on post data received by post data reception unit 45.

Editor 48 edits post data based on a result of analysis resulting from analysis processing by analysis processing unit 46.

Transmission manager 43 transmits post data edited by editor 48 based on association information stored in association information storage 44 to each terminal registered as a friend and a terminal which has transmitted post data as transmission destinations.

FIG. 5 is a diagram illustrating data stored in association information storage 44 based on the embodiment.

As shown in FIG. 5, a terminal ID is issued for each terminal. A user name and a character ID are brought in correspondence for each terminal ID. A character ID corresponding to a terminal and a character ID corresponding to another terminal registered as friend are also registered in association.

By way of example, terminal IDs "T1" to "T3" are allocated in correspondence with terminals 2A to 2C, respectively.

A user P and a character A generated by user P are registered in correspondence with terminal ID "T1" corresponding to terminal 2A. A character corresponding to a terminal for which friend relation with terminal 2A has been registered (friend characters B, C, . . . ) is registered in correspondence. Though description is given here with a character name being defined as a character ID for the sake of brevity of description, limitation to a character name is not particularly intended and a code number may also be acceptable. Anything is acceptable so long as a character can be specified.

A user Q and a character B generated by user Q are registered in correspondence with terminal ID "T2" corresponding to terminal 2B. A character corresponding to a terminal for which friend relation with terminal 2B has been registered (friend characters A, C, . . . ) is registered in correspondence.

A user R and character C generated by user R are registered in correspondence with terminal ID "T3" corresponding to terminal 2C. A character corresponding to a terminal for which friend relation with terminal 2C has been registered (friend characters A, B, . . . ) is registered in correspondence.

Other terminal IDs are also similarly registered in association with data.

Figure 6:
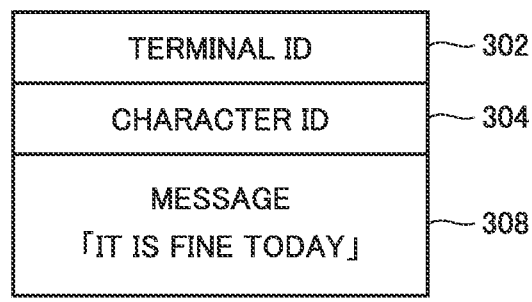
FIG. 6 is a diagram illustrating one example of post data transmitted to server 5 based on the embodiment.

FIG. 6 is a diagram illustrating one example of post data transmitted to server 5 based on the embodiment.

FIG. 6 shows post data 300 generated by post acceptance unit 32 of terminal 2 and transmitted to server 5.

Post data 300 includes terminal ID data 302, character ID data 304, and message data 308.

Terminal ID data 302 is data for specifying a transmitter terminal.

Character ID data 304 is data for specifying a character.

Message data 308 is data representing contents of an accepted message.

In the present example, "it is fine today" is set as message contents.

Figure 7:
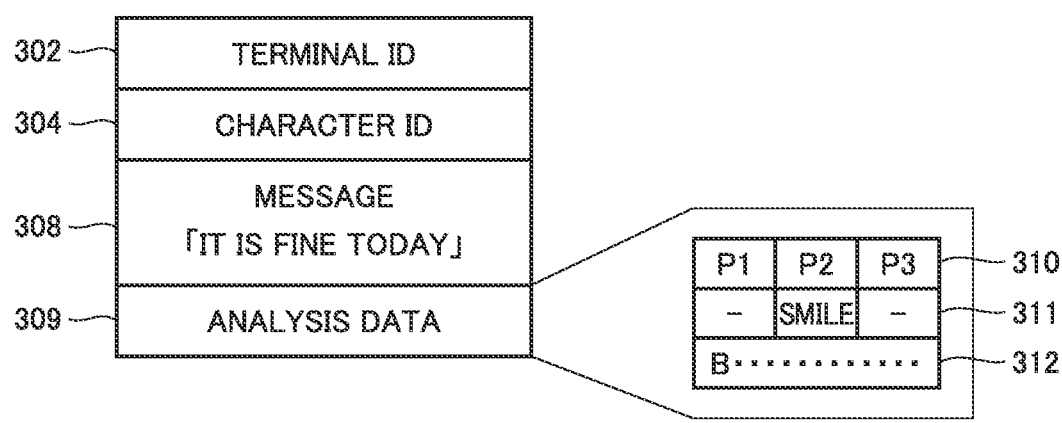
FIG. 7 is a diagram illustrating one example of post data transmitted from server 5 based on the embodiment.

FIG. 7 is a diagram illustrating one example of post data transmitted from server 5 based on the embodiment.

FIG. 7 shows post data 300A edited by server 5.

Post data 300A is different from post data 300 in addition of analysis data 309. Since post data 300A is otherwise the same, detailed description thereof will not be repeated.

In analysis data 309, various analysis parameters based on a result of analysis resulting from analysis of the message contents have been set.

In the present example, analysis data 309 includes clause data 310, emotion data 311, and utterance data 312.

Clause data 310 is constituted of clause IDs each identifying a breakpoint between clauses resulting from division of message contents "it is fine today" into prescribed units by way of example. By way of example, P1 to P3 are shown as clause IDs.

Emotion data 311 is constituted of data ("-, smile, -") identifying a type of emotion for each clause.

Utterance data 312 is constituted of data ("B, . . . ") identifying a mouth shape pattern in accordance with a pronounced character.

<Overview of Processing in Information Processing System>

Overview of processing in information processing system 1 based on the embodiment will now be described.

Figure 8:
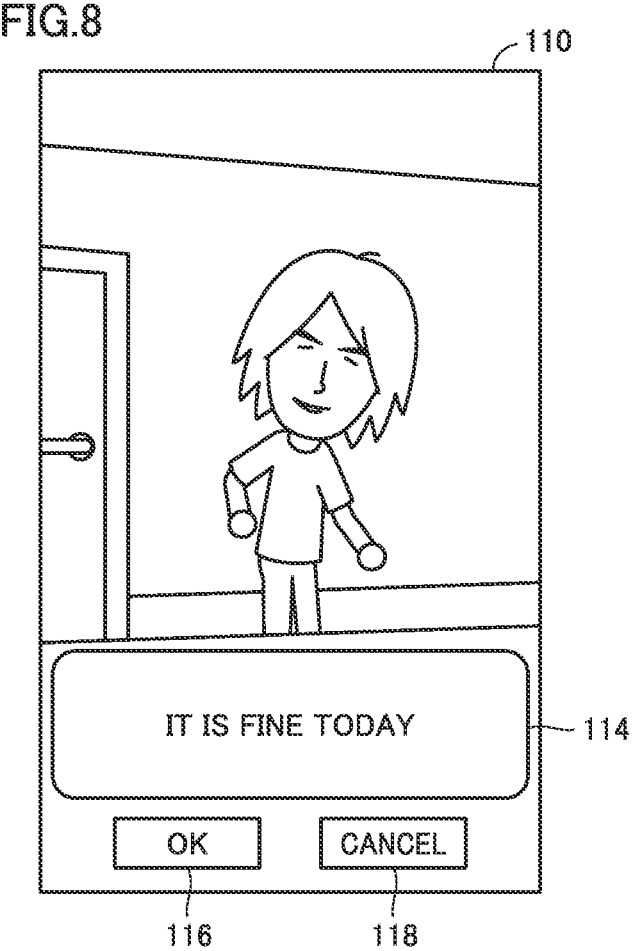
FIG. 8 is a diagram illustrating processing for posting a message based on the embodiment.

FIG. 8 is a diagram illustrating processing for posting a message based on the embodiment.

As shown in FIG. 8, post acceptance unit 32 of terminal 2A accepts an input for posting a message from a user in response to an instruction.

In the present example, a post screen 110 is displayed on display unit 17 of terminal 2A.

In post screen 110, a character 104 of A created by user P of terminal 2A is displayed. Post acceptance unit 32 accepts an input of a message from a user in a message input region 114 on post screen 110. In the present example, as user P operates input portion 16, a message "it is fine today" is input in message input region 114.

Post screen 110 includes an "OK" button 116 indicating completion of input of a post and a "cancel" button 118 stopping input of the post.

When a user selects "OK" button 116, post data is transmitted to server 5. Specifically, post data transmission unit 33 transmits the accepted message as post data to server 5.

When the user selects "cancel" button 118, processing for stopping input of posting processing is performed. In that case, post data is not transmitted.

Though processing for posting a message in terminal 2A is described in the present example, processing for posting a message in terminal 2B or another terminal is also the same.

Figure 9:
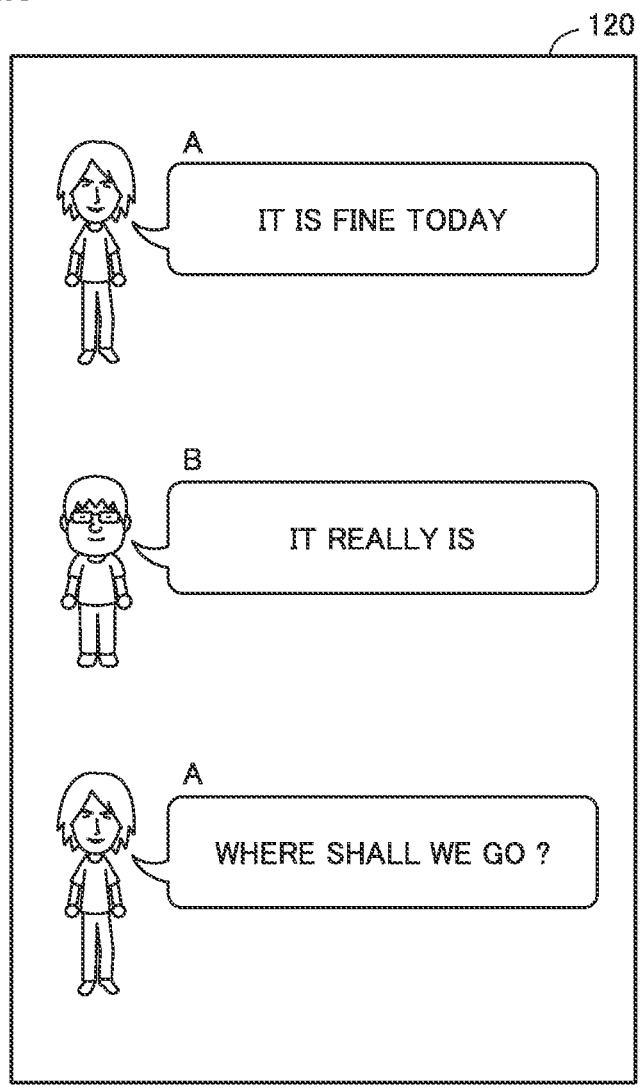
FIG. 9 is a diagram illustrating processing for viewing a posted message based on the embodiment.

FIG. 9 is a diagram illustrating processing for viewing a posted message based on the embodiment.

As shown in FIG. 9, representation output unit 52 of terminal 2C performs processing for displaying a message corresponding to a character, together with the character, based on the received post data.

In the present example, a viewing screen 120 is displayed on display unit 17 of terminal 2C possessed by user R.

On viewing screen 120, character A corresponding to user P of terminal 2A and a message corresponding to character A are displayed. Specifically, a message "it is fine today" posted by user P is displayed.

Character B corresponding to user Q of terminal 2B and a message corresponding to character B are displayed. Specifically, a message "it really is" posted by user Q is displayed.

Character A corresponding to user P of terminal 2A and a message corresponding to character A are displayed. Specifically, a message "where shall we go?" posted by user P is displayed.

Messages posted by user P of terminal 2A and user Q of terminal 2B are thus displayed in chronological order on display unit 17. A newly posted message is displayed as being added below in an up-down direction by way of example in the present example.

Display unit 17 is provided to allow scroll display in the up-down direction by way of example. A message not displayed on viewing screen 120 on display unit 17 can be displayed as a result of scroll display in response to an instruction for a scroll operation in the up-down direction by a user (for example, a flicking operation onto a touch panel).

On viewing screen 120, message reproduction processing such as audio output which will be described later is performed.

The present example shows a state that message reproduction processing has stopped.

Though processing for viewing a message on terminal 2C is described in the present example, processing for viewing a message on terminals 2A and 2B or another terminal is also the same.

<Data Communication in Information Processing System>

Figure 10:
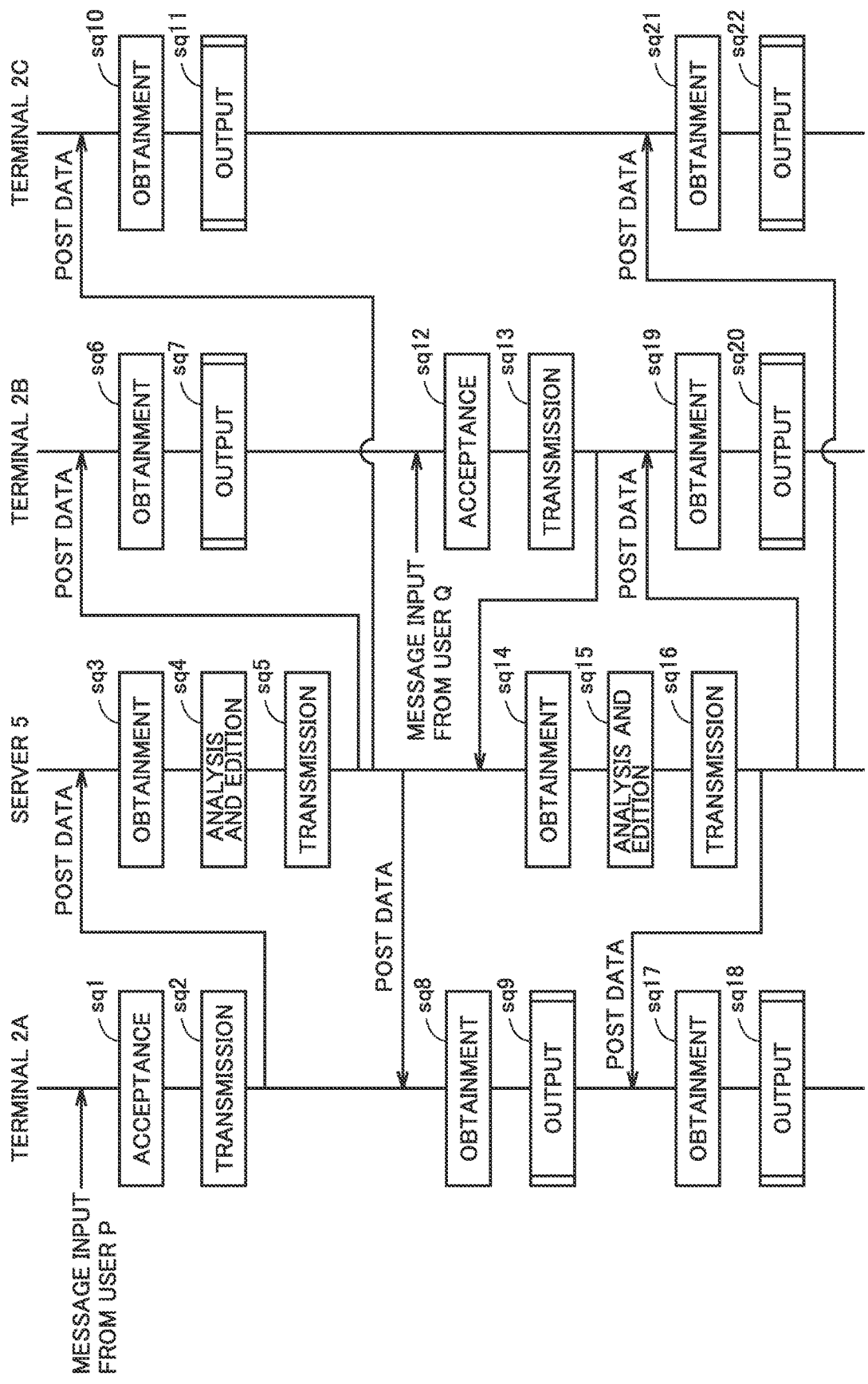
FIG. 10 is a diagram illustrating a flow of processing in data communication in the information processing system based on the embodiment.

FIG. 10 is a diagram illustrating a flow of processing in data communication in the information processing system based on the embodiment.

As shown in FIG. 10, a flow of processing in data communication between terminals 2A to 2C and server 5 will be described by way of example.

Terminal 2A accepts an input of a message from user P (sequence sq1). Specifically, as described with reference to FIG. 8, post acceptance unit 32 accepts an input of a posted message from user P. By way of example, a message "it is fine today" is accepted.

Then, terminal 2A transmits the accepted post data to server 5 (sequence sq2). Specifically, post data transmission unit 33 generates post data including a character ID and a message described with reference to FIG. 6 and transmits the post data to server 5.

Server 5 obtains the post data transmitted from terminal 2A (sequence sq3). Specifically, post data reception unit 45 receives post data from terminal 2A.

Server 5 subjects the received post data to analysis and edition processing (sequence sq4). Specifically, analysis processing unit 46 subjects the received post data to analysis processing. Editor 48 edits the post data based on a result of analysis resulting from analysis processing by analysis processing unit 46.

Server 5 transmits the edited post data to the terminals (sequence sq5). Specifically, transmission manager 43 selects terminal 2B and terminal 2C registered as friends and terminal 2A which is a sender as transmission destinations based on association information stored in association information storage 44 and transmits the post data.

Then, terminal 2C obtains the post data transmitted from server 5 (sequence sq10). Specifically, post data reception unit 51 receives the post data transmitted from server 5.

Then, terminal 2C performs output processing in accordance with the received post data (sequence sq11). Specifically, representation output unit 52 performs processing for displaying and outputting a character and a message based on the post data received through server 5 as described with reference to FIG. 9.

Reproduction output unit 53 performs processing for reproducing and outputting (for example, providing audio output of) a message based on the post data received through server 5.

Similar processing is performed also in another terminal 2A different from terminal 2C. Namely, post data transmitted from server 5 is obtained (sequence sq8) and output processing in accordance with the received post data is performed (sequence sq9). Similar processing is performed also in terminal 2B. Post data transmitted from server 5 is obtained (sequence sq6) and output processing in accordance with the received post data is performed (sequence sq7).

Then, terminal 2B accepts an input of a message from user Q (sequence sq12). Specifically, post acceptance unit 32 accepts an input of a message posted by user Q as described with reference to FIG. 8. By way of example, a message "it really is" is accepted.

Then, terminal 2B transmits the accepted post data to server 5 (sequence sq13). Specifically, post data transmission unit 33 generates post data including a character ID and a message described with reference to FIG. 6 and transmits the post data to server 5.

Server 5 obtains the post data transmitted from terminal 2B (sequence sq14). Specifically, post data reception unit 45 receives post data from terminal 2B.

Server 5 subjects the received post data to analysis and edition processing (sequence sq15). Specifically, analysis processing unit 46 subjects the received post data to analysis processing. Editor 48 edits the post data based on a result of analysis resulting from analysis processing by analysis processing unit 46.

Server 5 transmits the edited post data to the terminals (sequence sq16). Specifically, transmission manager 43 selects terminal 2A and terminal 2C registered as friends and terminal 2B which is a sender as transmission destinations based on association information stored in association information storage 44 and transmits the post data.

Then, terminal 2C obtains the post data transmitted from server 5 (sequence sq21). Specifically, post data reception unit 51 receives the post data transmitted from server 5.

Then, terminal 2C performs output processing in accordance with the received post data (sequence sq22). Specifically, representation output unit 52 performs processing for displaying and outputting a character and a message based on the post data received through server 5 as described with reference to FIG. 9.

Reproduction output unit 53 performs processing for reproducing and outputting (for example, providing audio output of) a message based on the post data received through server 5.

Similar processing is performed also in another terminal 2A different from terminal 2C. Namely, post data transmitted from server 5 is obtained (sequence sq17) and output processing in accordance with the received post data is performed (sequence sq18). In terminal 2B as well, post data transmitted from server 5 is obtained (sequence sq19) and output processing in accordance with the received post data is performed (sequence sq20).

Through the processing, a message posted in terminals 2A and 2B can be viewed on each terminal. A message can also be posted from terminal 2C.

Though a case that post data is transmitted from server 5 also to an apparatus which has accepted post data as a transmission destination is described in the present example, the apparatus which has accepted post data already has information. Therefore, it is also possible that post data does not have to be transmitted from server 5 to that apparatus. Though server 5 subjects post data to analysis and edition processing in the present example, server 5 may simply perform processing for transferring post data to another apparatus and each terminal may perform analysis and edition processing.

<Processing Flow in Server 5>

Figure 11:
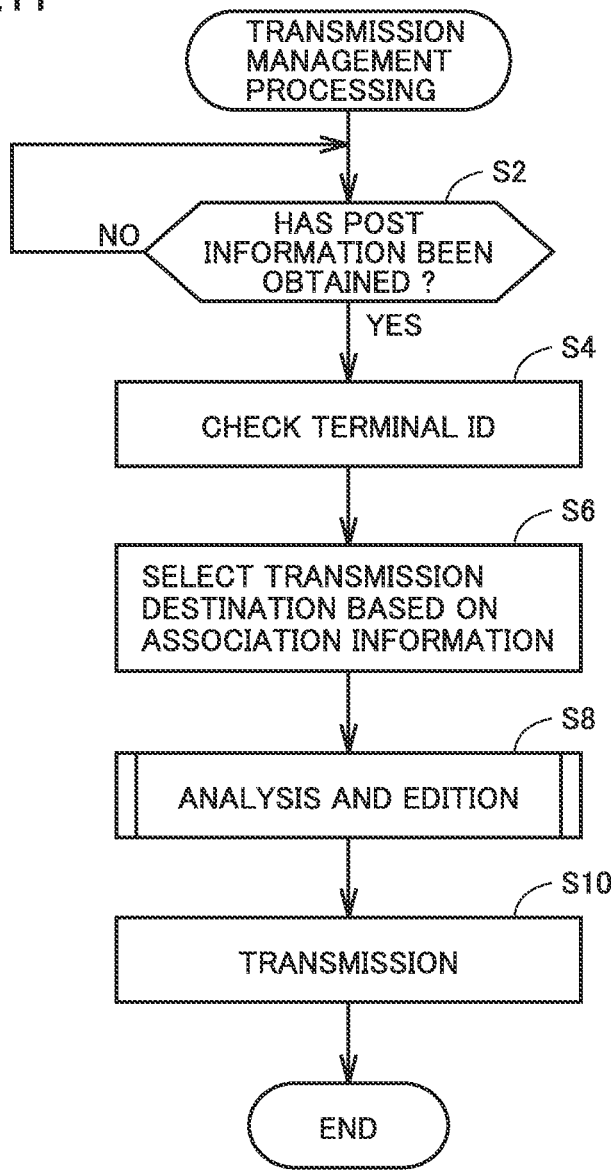
FIG. 11 is a flowchart illustrating processing performed in server 5 based on the embodiment.

FIG. 11 is a flowchart illustrating processing performed in server 5 based on the embodiment.

Server 5 has an application program for performing the processing stored in program storage 24.

As shown in FIG. 11, server 5 determines whether or not post data has been obtained from terminal 2 (step S2). Specifically, post data reception unit 45 determines whether or not post data has been received from terminal 2. By way of example, when received information includes message data, determination as post data can be made.

Then, in step S2, server 5 maintains the state until post data is obtained, and when it is determined that post data has been obtained (YES in step S2), the server checks a terminal ID (step S4). Specifically, transmission manager 43 checks the terminal ID included in the post data.

Then, server 5 selects a transmission destination based on association information (step S6). Specifically, transmission manager 43 obtains information on another terminal registered as a friend based on association information and in accordance with the terminal ID, and selects a terminal as a transmission destination. For example, when the terminal ID is "T1", terminals 2B and 2C corresponding to characters B and C and terminal 2A which is a sender are selected as transmission destinations based on the association information.

Then, server 5 subjects post data to analysis and edition processing (step S8).

Specifically, analysis processing unit 46 subjects post data received by post data reception unit 45 to analysis processing. Editor 48 subjects post data to edition processing based on a result of analysis resulting from analysis processing by analysis processing unit 46. The analysis processing and the edition processing will be described later.

Then, server 5 transmits the edited post data (step S10). Specifically, transmission manager 43 has the edited post data transmitted to selected terminals which are the transmission destinations.

Then, the process ends (end).

Figure 12:
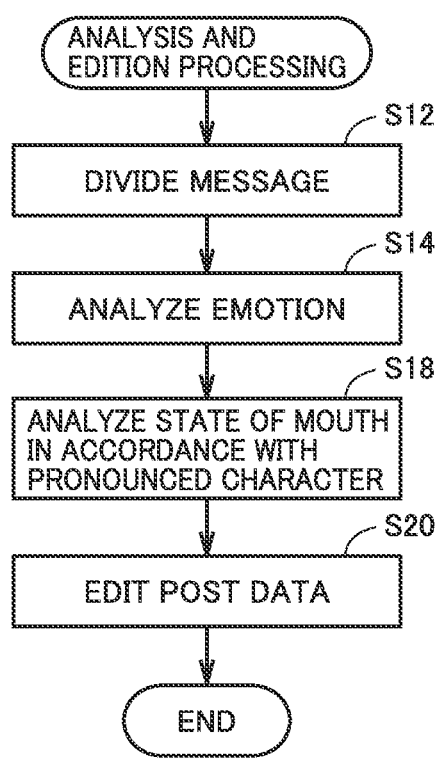
FIG. 12 is a flowchart illustrating analysis and edition processing performed in server 5 based on the embodiment.

FIG. 12 is a flowchart illustrating analysis and edition processing performed in server 5 based on the embodiment.

As shown in FIG. 12, server 5 divides a message into prescribed units (step S12). Specifically, analysis processing unit 46 divides the message into a plurality of clauses under a prescribed rule. A clause ID is issued for each divided clause.

Then, server 5 analyzes an emotion (step S14). Specifically, analysis processing unit 46 determines whether or not an expression included in the clause corresponds to a prescribed emotion expression for each clause.

Then, server 5 analyzes a state of the mouth in accordance with a pronounced character (step S18). Specifically, analysis processing unit 46 analyzes a mouth shape pattern in accordance with the pronounced character in message contents.

Then, server 5 edits post data (step S20). Specifically, editor 48 has clause data 310, emotion data 311, and utterance data 312 included in the post data, as described with reference to FIG. 7.

Then, the process ends (return).

Figures 13A, 13B:
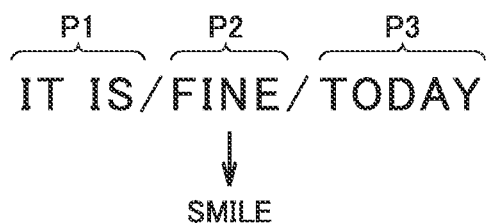
FIGS. 13A and 13B are diagrams illustrating processing (No. 1) for analyzing a message based on the embodiment.

FIGS. 13A and 13B are diagrams illustrating processing (No. 1) for analyzing a message based on the embodiment.

As shown in FIG. 13A, the message contents "it is fine today" are divided into three unit clauses. A clause ID is issued and allocated to each divided clause. In the present example, clause IDs "P1" to "P3" are allocated. A technique to divide a message into a minimum unit clause to such an extent as not being unnatural as an actual language is based on a symbol or a word, by using what is called known parsing or morpheme analysis, and the technique is not particularly restricted.

Clause ID "P1" corresponds to "it is."
Clause ID "P2" corresponds to "fine".
Clause ID "P3" corresponds to "today".

As shown in FIG. 13B, an emotion table relating to emotion expressions is shown.

As shown in FIG. 13B, a plurality of patterns are provided in advance as emotion expressions. By way of example, patterns including "smile", "anger", "normal", . . . are provided.

"Happy, fun, good" is registered as characters corresponding to "smile".

"Sad, sorry" is registered as characters corresponding to "anger".

An emotion which does not correspond to registered characters for emotion expressions is processed as normal.

By way of example, in the message contents "it is fine today," an emotion expression of "it is" is analyzed as "normal", an emotion expression of "fine" is analyzed as "smile", and an emotion expression of "today" is analyzed as "normal". Emotion data is set for each clause as a result of analysis.

A facial expression pattern of a character is brought in correspondence with a type of an emotion expression. For example, when the emotion expression is "smile", a smiley facial expression pattern is set. When the emotion expression is "anger", a grim facial expression pattern is set. When the emotion expression is "normal", a normal facial expression pattern is set.

In character representation reproduction processing which will be described later, a face representation in accordance with a facial expression pattern based on the set emotion data is provided.

Figures 14A, 14B:
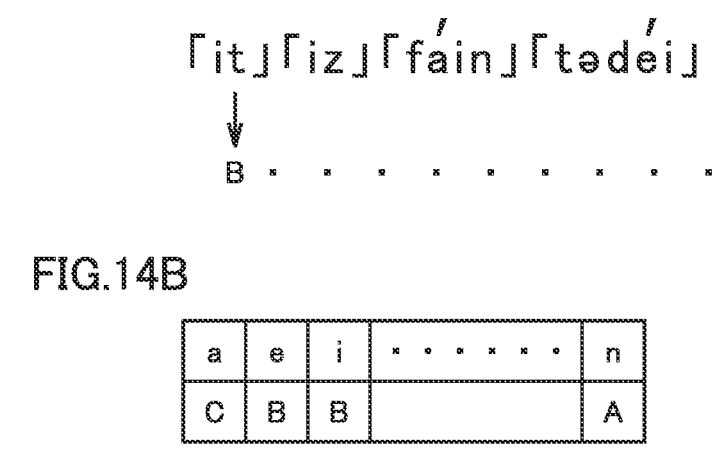

FIGS. 14A and 14B are diagrams illustrating processing (No. 2) for analyzing a message based on the embodiment.

As shown in FIG. 14A, phonetic symbols "it", "iz", "fáin", and " tədéi " for each word are shown for the message "it is fine today."

FIG. 14B is a diagram illustrating a correspondence table between a phonetic symbol and a mouth shape pattern.

Referring to FIG. 14B, a mouth shape pattern is set in advance in correspondence with a pattern of a phonetic symbol "á". In the present example, for example, a shape pattern "C" is allocated to the phonetic symbol "á". A shape pattern "A" is allocated to a phonetic symbol "n". For example, the shape pattern "A" is allocated as a shape with the mouth being closed. The shape pattern "C" is allocated as a shape with the mouth being wide open. A shape pattern "B" is allocated as a shape with the mouth being slightly open. The mouth shape pattern is not limited to three types, and by providing more types of shape patterns in correspondence with phonetic symbols, the mouth shape pattern can be close to a mouth shape in actual pronunciation. Thus, communication with sense of realism can be promoted.

A shape pattern in accordance with a pronounced character in message contents is analyzed with the use of the correspondence table.

FIG. 14A shows a case that utterance data of the shape pattern "B" is set in correspondence with the phonetic symbol "it" by way of example of a result of analysis.

In character representation reproduction processing which will be described later, a representation of the mouth of the shape pattern based on the set utterance data is provided.

<Processing Flow in Terminal 2>

FIG. 15 is a flowchart illustrating application processing in terminal 2 based on the embodiment.

Referring to FIG. 15, each terminal 2 has an application program for performing the application processing stored in program storage 15.

Steps S30 and S32 are processing mainly performed by post acceptance unit 32 and post data transmission unit 33. Steps S36 to S44 are processing mainly performed by post data reception unit 51, representation output unit 52, and reproduction output unit 53.

As shown in FIG. 15, terminal 2 determines whether or not an input of a post has been accepted (step S30). Specifically, post acceptance unit 32 determines whether or not a message has been input by the user in message input region 114 on post screen 110 described with reference to FIG. 8 and whether or not "OK" button 116 has been selected.

When terminal 2 determines in step S30 that the input of the post has been accepted (YES in step S30), it performs processing for posting (step S32). Specifically, post data transmission unit 33 transmits post data described with reference to FIG. 6 to server 5.

Then, the process proceeds to step S34 and terminal 2 determines whether or not to quit the application processing. For example, terminal 2 determines whether or not an instruction to quit the application processing in accordance with a prescribed operation instruction onto input portion 16 has been given.

When terminal 2 determines in step S34 that an instruction to quit the application processing has not been given and application processing does not end (NO in step S34), the process returns to step S30 and the processing above is repeated.

When terminal 2 determines in step S34 that an instruction to quit the application processing has been given and the application processing ends (YES in step S34), it quits the application processing without returning to step S30 (end).

When terminal 2 determines in step S30 that an input of a post has not been accepted (NO in step S30), the process proceeds to step S36.

In step S36, terminal 2 determines whether or not post data has been obtained from server 5 (step S36). Specifically, post data reception unit 51 determines whether or not post data has been received from server 5.

When terminal 2 determines in step S36 that post data has been obtained from server 5 (YES in step S36), a message and a character are arranged in a virtual screen region (step S38). Specifically, representation output unit 52 arranges a character based on a character ID and a message in the virtual screen region, based on the character ID and message data included in the obtained post data.

FIG. 16 is a diagram illustrating setting of a virtual screen region and a display region based on the embodiment.

FIG. 16 shows a virtual screen region 200. Virtual screen region 200 is provided to be expandable, and a region for arranging a message is expanded each time post data is obtained. In the present example, the region is expanded as a message is arranged below in chronological order. When post data is newly obtained, virtual screen region 200 is expanded in accordance with a size of a message in the post data.

A message identification number 202 is issued each time post data is obtained. By way of example, a message identification number (M1 to M5) is allocated for each piece of post data. A reproduction flag 204 is provided in association with a message identification number, and when message reproduction processing which will be described later is performed, the reproduction flag is set to on ("X"). When the reproduction flag is off by way of example, "X" is erased.

A display region 210 is provided, and a region in accordance with a display screen size of display unit 17 is set. Display unit 17 displays information (such as a message) arranged in virtual screen region 200 included in display region 210.

In the present example, messages in post data corresponding to message identification numbers (M2 to M4) are included in display region 210. Display unit 17 displays characters based on character IDs and messages included in post data having the message identification numbers (M2 to M4).

Relative positional relation of virtual screen region 200 with display region 210 changes as a user indicates a scroll operation through input portion 16.

For example, when a position of display region 210 is fixed, virtual screen region 200 is moved in the up-down direction with respect to display region 210 in response to an instruction for the scroll operation, so that scroll display is provided. For example, as virtual screen region 200 moves upward with respect to display region 210, a character based on a character ID and a message included in post data having a message identification number (M5) are displayed. In contrast, as virtual screen region 200 moves downward with respect to display region 210, a character based on a character ID and a message included in post data having a message identification number (M1) are displayed.

Referring again to FIG. 15, terminal 2 then sets and displays a display region (step S40). Specifically, representation output unit 52 sets display region 210 in virtual screen region 200. As the user indicates a scroll operation through input portion 16, relative positional relation of virtual screen region 200 with display region 210 changes and display region 210 is set based thereon. Then, representation output unit 52 has display unit 17 display information (a character and a message) in the post data arranged in virtual screen region 200 included in display region 210.

Then, terminal 2 performs reproduction output processing (step S42). Specifically, reproduction output unit 53 performs processing for reproducing and outputting a message included in the display region. The reproduction output processing will be described later. Then, the process proceeds to step S34.

When terminal 2 determines in step S36 that post data has not been obtained from server 5 (NO in step S36), it determines whether or not an instruction for a scroll operation has been given through input portion 16 on viewing screen 120 (step S44). Specifically, representation output unit 52 determines whether or not an instruction for a scroll operation has been given through input portion 16 on viewing screen 120.

When terminal 2 determines in step S44 that an instruction for a scroll operation has been given through input portion 16 on viewing screen 120 (YES in step S44), the process proceeds to step S40. Specifically, representation output unit 52 sets display region 210 based on change in relative positional relation of virtual screen region 200 with display region 210, as the user indicates a scroll operation through input portion 16. Then, representation output unit 52 has display unit 17 display information (a character and a message) in the post data arranged in virtual screen region 200 included in display region 210. Since subsequent processing is the same as described above, detailed description thereof will not be repeated.

When terminal 2 determines in step S44 that an instruction for a scroll operation has not been given through input portion 16 on viewing screen 120 (NO in step S44), the process proceeds to step S34.

Through the processing, when an instruction for a scroll operation has been given through input portion 16 on viewing screen 120, viewing screen 120 is changed through scroll display. Reproduction output processing is accordingly performed.

Figure 17:
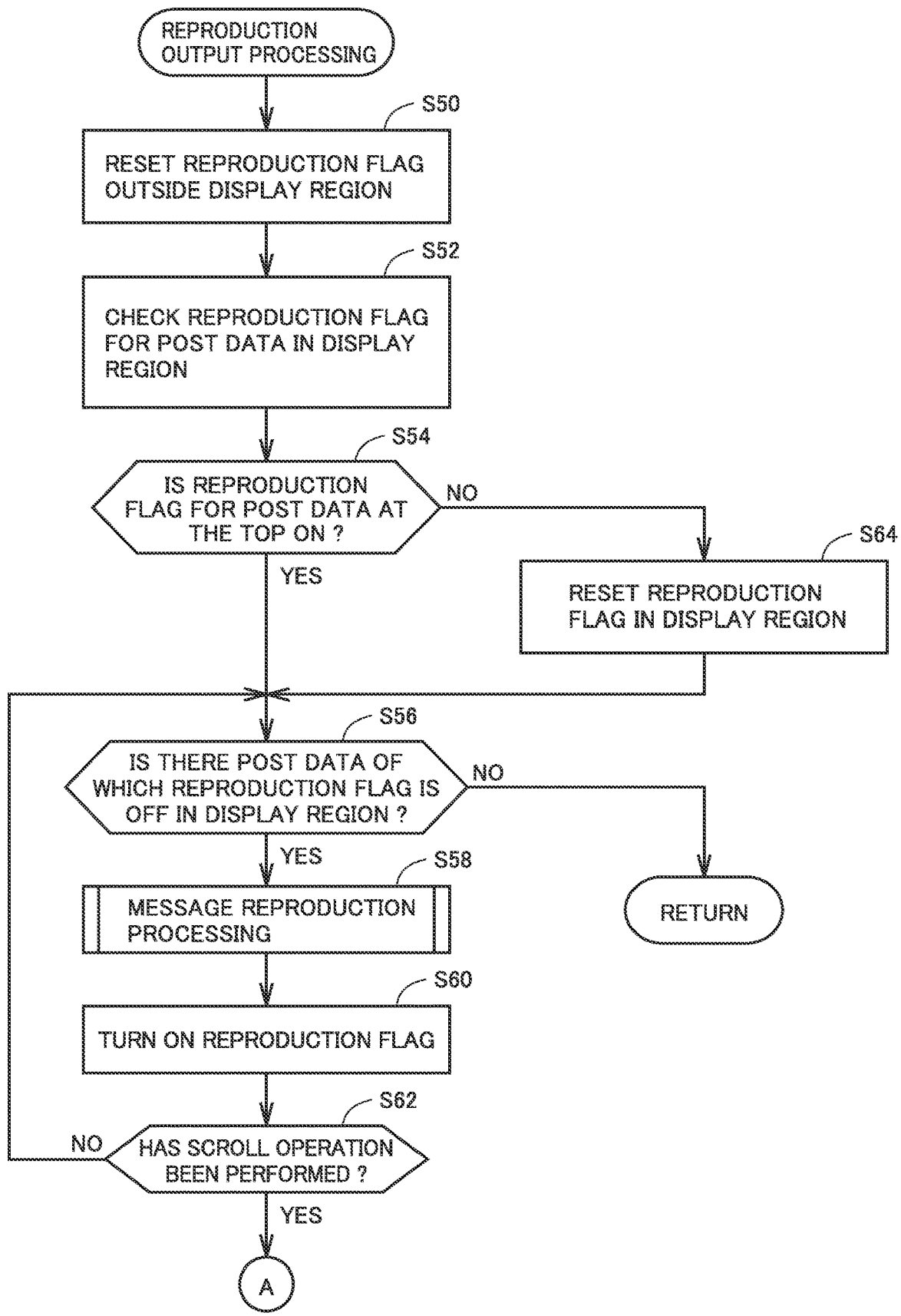
FIG. 17 is a flowchart illustrating reproduction output processing in terminal 2 based on the embodiment.

FIG. 17 is a flowchart illustrating reproduction output processing in terminal 2 based on the embodiment.

As shown in FIG. 17, terminal 2 resets a reproduction flag outside the display region (step S50). Specifically, reproduction output unit 53 resets all reproduction flags (turns off reproduction flags) provided in association with a message identification number of post data arranged in virtual screen region 200 outside display region 210.

Then, terminal 2 checks a reproduction flag corresponding to post data in the display region (step S52). Specifically, reproduction output unit 53 checks the reproduction flag provided in association with message identification information allocated to post data in display region 210.

Then, terminal 2 determines whether or not a reproduction flag of post data at the top is turned on ("X") (step S54). Specifically, reproduction output unit 53 determines whether or not a reproduction flag of first post data (at the top) in display region 210 is turned on.

Then, when terminal 2 determines in step S54 that the reproduction flag of the post data at the top is turned on ("X") (YES in step S54), it determines whether or not there is post data of which reproduction flag is off in the display region (step S56). Specifically, reproduction output unit 53 determines whether or not there is any reproduction flag corresponding to post data in display region 210 is not on.

Then, when terminal 2 determines that there is post data of which reproduction flag is off in the display region (YES in step S56), it performs message reproduction processing for that post data (step S58). When it is determined that there is post data of which reproduction flag is not on in display region 210, that is, when it is determined that there is post data of which reproduction flag is off in display region 210, reproduction output unit 53 performs message reproduction processing for that post data. The message reproduction processing will be described later.

Then, terminal 2 sets the reproduction flag corresponding to the post data to on after the message reproduction processing (step S60). Reproduction output unit 53 sets the reproduction flag of reproduced post data to on ("X").

Then, terminal 2 determines whether or not an instruction for a scroll operation has been given through input portion 16 on viewing screen 120 (step S62). Specifically, representation output unit 52 determines whether or not an instruction for a scroll operation has been given through input portion 16 on viewing screen 120.

When terminal 2 determines that an instruction for a scroll operation has not been given through input portion 16 on viewing screen 120 (NO in step S62), the process returns to step S56, and processing by reproduction output unit 53 is repeated.

When terminal 2 determines in step S56 that the reproduction flag corresponding to the post data in display region 210 is not off (NO in step S56), reproduction output processing ends (return). When it is determined that the reproduction flags corresponding to post data in display region 210 are all on ("X"), reproduction output unit 53 quits the reproduction output processing.

Through the processing, the message reproduction processing for post data of which reproduction flag in display region 210 is off is sequentially performed. When the reproduction flags corresponding to the post data in display region 210 are all on, the reproduction output processing ends.

When terminal 2 determines that an instruction for a scroll operation has been given through input portion 16 on viewing screen 120 (YES in step S62), the process returns to step S40 in FIG. 15. Specifically, representation output unit 52 sets display region 210 in virtual screen region 200. As the user indicates the scroll operation through input portion 16, relative positional relation of virtual screen region 200 with display region 210 changes and display region 210 is set based thereon. Then, representation output unit 52 has information (a character and a message) of post data included in display region 210 displayed.

When terminal 2 determines in step S54 that the reproduction flag of the post data at the top is not on ("X") (NO in step S54), the reproduction flag corresponding to the post data in display region 210 is reset (step S64). Then, the process proceeds to step S56. Reproduction output unit 53 resets all reproduction flags (turns off reproduction flags) corresponding to the post data in display region 210. Then, the process proceeds to step S56.

Through the processing, when the reproduction flag of the post data at the top in display region 210 is off, reproduction flags of all post data in display region 210 are set to off. Therefore, when message reproduction processing of the post data at the top is performed, message reproduction processing is performed sequentially for subsequent post data.

In the processing, a reproduction flag outside the display region is reset in step S50. For example, after the message reproduction processing in step S58, when virtual screen region 200 is moved downward with respect to display region 210 as the user indicates a scroll operation through input portion 16 in step S62, post data of which reproduction flag is off is arranged at the top of display region 210. A reproduction flag of other post data is accordingly reset. Therefore, when virtual screen region 200 is moved downward with respect to display region 210 as the user indicates a scroll operation through input portion 16, message reproduction processing is performed sequentially from the post data arranged at the top of display region 210.

<Message Reproduction Processing>

Figure 18:
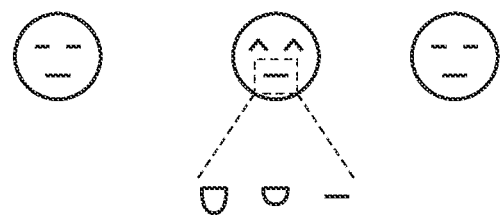
FIG. 18 is a diagram illustrating a concept of message reproduction processing based on the embodiment.

FIG. 18 is a diagram illustrating a concept of message reproduction processing based on the embodiment.

As shown in FIG. 18, by way of example, message contents "it is" "fine" "today" are shown.

In the embodiment, reproduction output unit 53 performs three types of reproduction processing as message reproduction processing.

Specifically, message audio reproduction processing reproducing reproduction processing with voice and sound, message representation reproduction processing performing reproduction processing with representation processing, and character representation reproduction processing performing reproduction processing through character representation processing are performed.

The message audio reproduction processing provides audio output of a message for each character.

The message representation reproduction processing changes a color of representation of a message in accordance with a reproduction position of a message of which audio output is provided. Specifically, in an initial state, a message displayed by way of example is shown with a white character. Then, clause data corresponding to a reproduction position is colored. By way of example, in audio output of "fine", a white character of "fine" is colored to black and displayed. Though coloring of a white character to a black character is described in the present example, limitation thereto is not particularly intended and any method may be employed so long as change to a different color is made.

Though message representation reproduction processing in the present example changes a color of representation of a message in accordance with a reproduction position by coloring, limitation thereto is not intended, and a size of a message in accordance with a reproduction position may be changed for a highlighted representation. Alternatively, a message in accordance with a reproduction position may dynamically be changed for a highlighted representation.

The character representation reproduction processing changes a state of a face and the mouth of a character displayed in accordance with a reproduction position of a message of which audio output is provided. Specifically, a facial expression pattern is set based on emotion data corresponding to clause data. Then, a mouth shape pattern is set based on utterance data. Reproduction output unit 53 then performs representation processing, with both of the set face and mouth having been synthesized. By way of example, for the message "fine", emotion data corresponding to the clause data is "smile". Therefore, a smiley facial expression pattern is set. Then, the mouth shape pattern is set based on utterance data corresponding to a reproduction position of a pronounced word "fine". For example, the mouth is represented as being closed stepwise, in accordance with the mouth shape pattern corresponding to a pattern of phonetic symbols.

By providing audio output of a message through the processing, a message can not only visually but also aurally be recognized. Therefore, since a corresponding character is felt as if it were talking, communication with sense of reality can be achieved.

By changing a color of clause data in correspondence with a reproduction position in audio output, a message is displayed in an emphasized manner with lapse of time. Therefore, since a corresponding character is felt as if it were talking, communication with sense of reality can be achieved.

By setting the mouth shape pattern in accordance with a pattern of a phonetic symbol in correspondence with a reproduction position in audio output, a corresponding character is felt as if it were talking with its mouth being actually moved. Thus, communication with sense of reality can be achieved.

A facial expression of a corresponding character also changes in accordance with message contents. Therefore, since a corresponding character is felt as if it were actually talking, communication with sense of reality can be achieved.

An animated representation of a motion (an effect) of the entire body may be provided, without being limited only to a face of a character. By reproducing and outputting a motion of a character to a user, a corresponding character is felt as if it were moving the entire body and actually talking. Thus, communication with sense of reality can be achieved.

A plurality of operation patterns may be provided in advance and one of the plurality of operation patterns may be selected for an animated representation. Specifically, one of the plurality of operation patterns may be selected for an animated representation, based on emotion data included in analysis data 309. For example, when emotion data indicates "smile", an operation pattern evoking an enjoyable situation is preferably selected for an animated representation.

Through the processing, since a communication expression can be closer to actual conversation, expressions in communication can be diversified and communication between/among users can be promoted.

Figure 19:
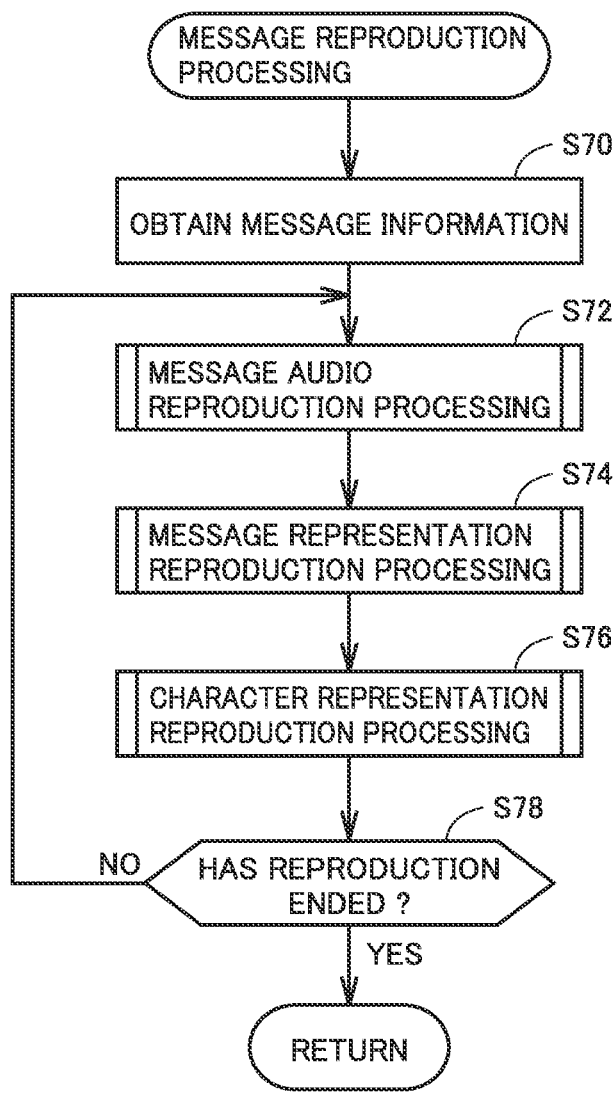
FIG. 19 is a flowchart illustrating the message reproduction processing based on the embodiment.

FIG. 19 is a flowchart illustrating the message reproduction processing based on the embodiment.

As shown in FIG. 19, terminal 2 obtains message information (step S70). Specifically, reproduction output unit 53 obtains message information of post data of which reproduction flag is off. Specifically, reproduction output unit 53 extracts a character ID, message data 308, and analysis data 309 from post data.

Then, terminal 2 performs message audio reproduction processing (step S72). Reproduction output unit 53 performs message audio reproduction processing based on message data 308 and analysis data 309. Message audio reproduction processing will be described later.

Then, terminal 2 performs message representation reproduction processing (step S74). Reproduction output unit 53 performs message representation reproduction processing based on message data 308, analysis data 309, and reproduction position information in message audio reproduction processing. The message representation reproduction processing will be described later.

Then, terminal 2 performs character representation reproduction processing (step S76). Reproduction output unit 53 performs character representation reproduction processing based on a character ID, analysis data 309, and the reproduction position information in message audio reproduction processing. The character representation reproduction processing will be described later.

Then, terminal 2 determines whether or not reproduction processing has ended (step S78). Reproduction output unit 53 determines whether or not reproduction processing for a message in post data has ended.

When terminal 2 determines that reproduction processing has ended (YES in step S78), the process ends (return).

When terminal 2 determines that reproduction processing has not ended (NO in step S78), the process returns to step S72 and the processing is repeated until the reproduction processing ends.

Figure 20:
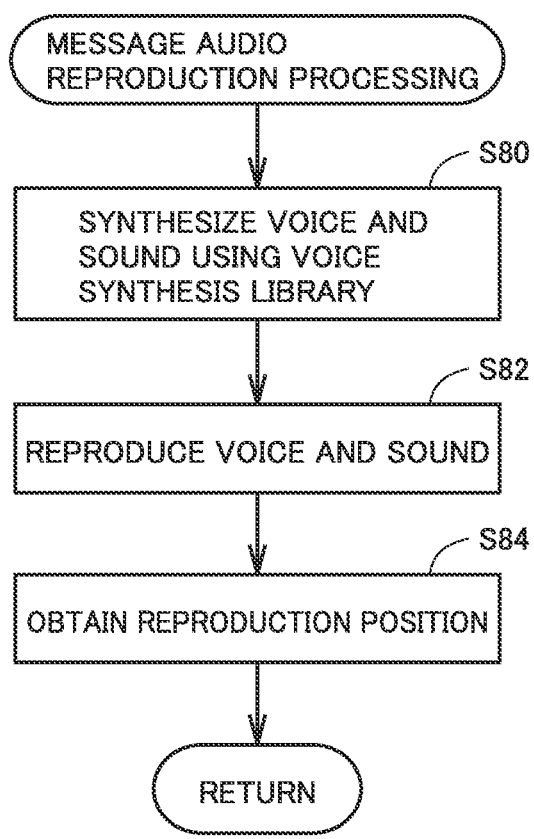
FIG. 20 is a flowchart illustrating message audio reproduction processing based on the embodiment.

FIG. 20 is a flowchart illustrating message audio reproduction processing based on the embodiment.

As shown in FIG. 20, terminal 2 subjects message data in post data to voice synthesis by using a voice synthesis library (step S80). Specifically, reproduction output unit 53 performs voice synthesis of a message for each clause by using a voice synthesis library.

Then, terminal 2 provides audio reproduction (step S82). Reproduction output unit 53 reproduces audio data resulting from voice synthesis.

Then, terminal 2 obtains a reproduction position (step S84). Reproduction output unit 53 obtains a reproduction position of audio data in message data.

Then, the process ends (return).

In reproducing audio data, parameters such as a pitch, a speed, an accent, and a tone of voice and sound are set to any value in advance, and audio data is reproduced based on the parameters. Each parameter is provided to accept arbitrary change in setting.

Figure 21:
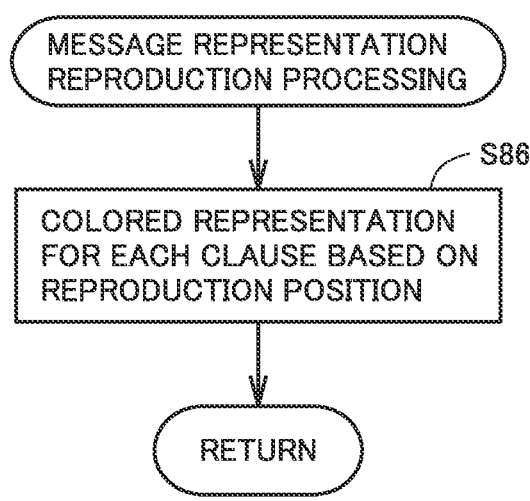
FIG. 21 is a flowchart illustrating message representation reproduction processing based on the embodiment.

FIG. 21 is a flowchart illustrating message representation reproduction processing based on the embodiment.

As shown in FIG. 21, terminal 2 provides a colored representation for each clause based on the obtained reproduction position (step S86). Reproduction output unit 53 performs message representation reproduction processing based on message data 308, analysis data 309, and the reproduction position information from the message audio reproduction processing. Reproduction output unit 53 performs colored representation processing for each clause based on a reproduction position. By way of example, reproduction output unit 53 changes a character in a clause displayed in white to a black character.

Then, the process ends (return).

Figure 22:
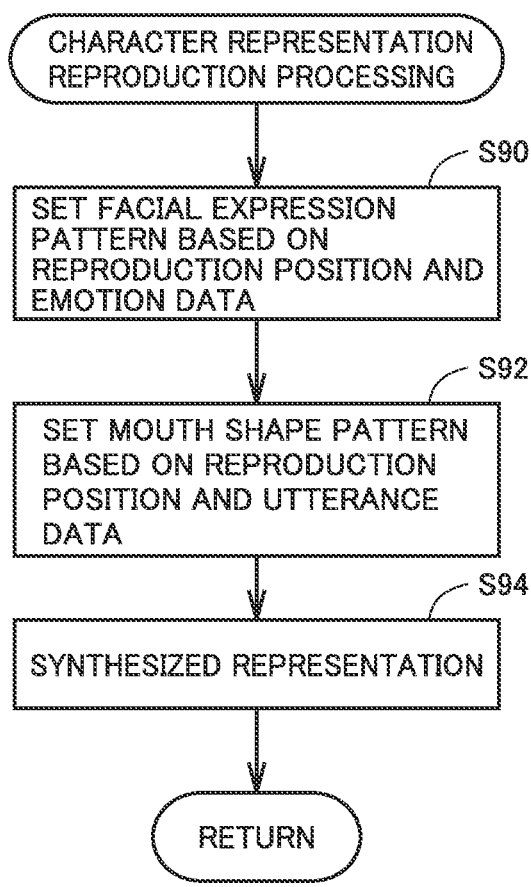
FIG. 22 is a flowchart illustrating character representation reproduction processing based on the embodiment.

FIG. 22 is a flowchart illustrating character representation reproduction processing based on the embodiment.

As shown in FIG. 22, terminal 2 sets a face pattern based on the obtained reproduction position and emotion data (step S90). Specifically, reproduction output unit 53 sets a facial expression pattern at a reproduction position of a message for each clause, based on emotion data for each clause included in analysis data.

Then, terminal 2 sets a mouth shape pattern based on the obtained reproduction position and utterance data (step S92). Specifically, reproduction output unit 53 selects a mouth shape pattern at a reproduction position of a message based on mouth shape pattern data included in analysis data (step S92).

Then, terminal 2 provides a synthesized representation (step S94). Specifically, reproduction output unit 53 has display unit 17 display a face representation which is synthesis of the facial expression pattern and the mouth shape pattern.

Then, the process ends (return).

(First Modification)

When it is determined in step S56 of reproduction output processing in FIG. 17 that a reproduction flag corresponding to post data in display region 210 is not off (NO in step S56) and it is determined that all reproduction flags are on, reproduction output processing ends, however, automatic scroll display may be provided. Specifically, virtual screen region 200 may be moved upward with respect to display region 210 so that scroll display of post data in virtual screen region 200 not displayed in display region 210 may be provided. Then, the process proceeds to step S58 and message reproduction processing is performed.

When message reproduction processing for post data in display region 210 is completed through the processing, post data not displayed in display region 210 can automatically be displayed through scroll display, and message reproduction processing is continued. Thus, post data can be viewed without a scroll operation in response to an instruction from a user.

(Second Modification)

When it is determined in step S56 of reproduction output processing in FIG. 17 that a reproduction flag corresponding to post data in display region 210 is not off (NO in step S56) and it is determined that all reproduction flags are on, reproduction output processing ends, however, message reproduction processing may be repeated (repeated reproduction). Specifically, a reproduction flag in the display region may be reset as described with reference to step S64, the process may proceed to step S58, and message reproduction processing may be performed.

By repeatedly performing message reproduction processing for the post data in display region 210 through the processing, message contents of the post data can be understood and communication between/among users can be promoted.

(Third Modification)

Though message reproduction processing for post data of which reproduction flag is off after the reproduction flag is reset has been described in the embodiment above as the reproduction output processing in FIG. 17, the reproduction flag does not have to be reset.

Namely, post data which is once reproduced is not subjected to message reproduction processing, and message reproduction processing is performed only for new post data.

By performing message reproduction processing only for new post data, zest for new post data can be enhanced.

In the embodiment above, whether or not a reproduction flag is on is checked from the post data at the top in display region 210, and when the reproduction flag is off, message reproduction processing is performed from the post data at the top. Message reproduction processing, however, may successively be performed from post data designated by a user through a touch operation onto input portion 16, among post data in display region 210.

By successively performing message reproduction processing from post data designated by the user, message reproduction processing reflecting a user's intention can be performed.

Other Embodiments

Though data communication between/among terminals through server 5 has been described in the embodiment above, data may directly be communicated without going through server 5. Each terminal 2 may have a function for analysis and edition processing of post data described in connection with server 5.

Specifically, terminals 2A to 2C can each make use of a wireless communication function of communication unit 11 and terminals included in coverage can establish wireless communication.

"Direct data communication" refers to communication by automatic (without an operation by a user) and direct transmission of prescribed data ("post data" by way of example) stored in memory 14 to other terminals 2B and 2C present at a short distance from terminal 2A. Then, other terminals 2B and 2C perform output processing based on the post data.

More specifically, wireless communication is carried out by cooperation of CPU 13 and communication unit 11 of terminal 2. This processing is processing performed as background processing, for example, while terminal 2 is in what is called a sleep state (which may also be referred to as a stand-by state). For example, during sleep, such control that communication unit 11 basically mainly operates and sleep of CPU 13 is temporarily canceled as necessary so that CPU 13 temporarily mainly operates is carried out (for example, processing for searching for another terminal is performed by communication unit 11 and transmission and reception of data is carried out by CPU 13). In addition, for example, terminal 2 may include, separately from CPU 13, a second CPU operable with low power consumption, and during sleep, the second CPU may mainly operate. Moreover, wireless communication in the present example may be carried out as appropriate during processing of an application or in response to an instruction operation by a user even when terminal 2 is not in a sleep state. Wireless communication can also be carried out as background processing during execution of an application.

In wireless communication, for example, terminal 2 repeatedly searches for another unspecified terminal 2 present within coverage of near field communication. Then, terminal 2 establishes communication with another terminal 2 which was found as a result of search. Then, terminal 2 automatically transmits communication data stored in memory 14 or automatically receives communication data stored in memory 14 of another terminal 2 from that another terminal 2. Communication may be such that transmission and reception are both carried out.

Wireless communication above can be carried out, for example, at the time when users each carrying terminal 2 pass each other.

An application executable by a personal computer may be provided as a program in the present embodiment. Here, the program according to the present embodiment may be incorporated as a partial function (a module) of various applications executed on the personal computer.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims. The word "comprising" does not exclude the presence of elements or steps other than those listed in a claim. The word "a" or "an" preceding an element does not exclude the presence of a plurality of such elements.

What is claimed is:

1. An information processing system in which a plurality of information processing apparatuses communicate data through a server,
a first information processing apparatus configured to at least perform:
a first message acceptance which accepts input of a first message input by a user who operates the first information processing apparatus, and
a first message transmission which transmits the accepted first message and first character information to the server,
a second information processing apparatus configured to at least perform:
a second message acceptance which accepts input of a second message input by a user who operates the second information processing apparatus, and
a second message transmission which transmits the accepted second message and second character information to the server,
the first information processing apparatus further configured to perform:
a representation output which provides display, in chronological order, of the first message brought in correspondence with a first character based on the first character information and the second message brought in correspondence with a second character based on the second character information obtained through the server,
the representation output also providing display of an emotional pattern of the character in correspondence with at least one of the first and second messages based on emotion data obtained as a result of an analysis of content of the at least one of the first and second messages, the analysis of the content of the at least one of the first and second messages including a division of the content into unit clauses and an analysis of the unit clauses to automatically set the emotion data for each of the clauses, and
a reproduction output which provides audio output of the first message and the second message.

2. The information processing system according to claim 1, wherein
performance of the reproduction output includes processing for displaying a character based on a result of analysis of contents of at least any of the first message and the second message and corresponding character information.

3. The information processing system according to claim 2, wherein
performance of the reproduction output includes processing for displaying the character based on the result of analysis and the corresponding character information while audio output of the first message and the second message is provided.

4. The information processing system according to claim 1, wherein
performance of the reproduction output includes processing for displaying at least any of the first message and the second message based on a result of analysis of contents of at least any of the first message and the second message.

5. The information processing system according to claim 1, wherein
the reproduction output provides audio output of at least any of the first message and the second message based on a result of analysis of contents of at least any of the first message and the second message.

6. The information processing system according to claim 1, wherein
messages displayed in chronological order are provided such that scroll display of the messages can be provided in response to an operation by the user, and
performance of the reproduction output includes determination of whether or not the first or second message is displayed in a screen and successively provides audio output of the messages displayed in the screen.

7. The information processing system according to claim 1, wherein
the character is an avatar representing the user.

8. The information processing system according to claim 7, wherein
the reproduction output provides animated representation of the avatar.

9. The information processing system according to claim 8, wherein
the reproduction output provides animated representation of the avatar by selecting one of a plurality of operation patterns.

10. The information processing system according to claim 1, wherein
the reproduction output sequentially provides audio output of the messages displayed in chronological order.

11. The information processing system according to claim 10, wherein
the reproduction output sequentially and repeatedly provides audio output of the displayed messages.

12. The information processing system according to claim 10, wherein
the reproduction output provides scroll display of messages not displayed and sequentially and repeatedly provides audio output of the messages of which scroll display is provided.

13. The information processing system according to claim 1, wherein
the reproduction output obtains a result of analysis of message contents obtained through the server, which corresponds to a reproduction position in audio output of the message.

14. The information processing system according to claim 13, wherein
performance of the reproduction output includes processing for displaying the message based on the obtained result of analysis.

15. The information processing system according to claim 13, wherein
performance of the reproduction output includes processing for displaying a character based on the obtained result of analysis and corresponding character information.

16. An information processing system in which a plurality of information processing apparatuses can communicate data through a server,
a first information processing apparatus configured to at least perform:
a first message acceptance which accepts input of a first message input by a user who operates the first information processing apparatus, and
a first message transmission which transmits the accepted first message and first character information to the server,
a second information processing apparatus configured to at least perform:
a second message acceptance which accepts input of a second message input by a user who operates the second information processing apparatus, and
a second message transmission which transmits the accepted second message and second character information to the server,
the first information processing apparatus configured to further perform:
a representation output which provides display, in chronological order, of the first message brought in correspondence with a first character based on the first character information and the second message brought in correspondence with a second character based on the second character information obtained through the server,
the representation output also providing display of an emotional pattern of the character in correspondence with at least one of the first and second messages based on emotion data obtained as a result of an analysis of content of the at least one of the first and second messages, the analysis of the content of the at least one of the first and second messages including a division of the content into unit clauses and an analysis of the unit clauses to automatically set the emotion data for each of the clauses; and
a reproduction output which performs reproduction processing based on a result of analysis of contents of the first and second messages.

17. An information processing apparatus capable of communicating data with another information processing apparatus through a server, comprising:

processing circuitry and a storage medium storing instructions which upon execution by the processing circuitry configure the information processing apparatus to at least perform:
- a message acceptance which accepts input of a first message input by a user who operates the information processing apparatus;
- a message transmission which transmits the accepted first message and first character information to the server;
- a representation output which provides display, in chronological order, of a first character based on the first character information brought in correspondence with the first message, and a second message and a second character based on second character information, which have been input from another information processing apparatus and obtained through the server;
- the representation output also providing display of an emotional pattern of the character in correspondence with at least one of the first and second messages based on emotion data obtained as a result of an analysis of content of the at least one of the first and second messages, the analysis of the content of the at least one of the first and second messages including a division of the content into unit clauses and an analysis of the unit clauses to automatically set the emotion data for each of the clauses; and
- an audio output which provides audio output of the first message and the second message.

18. A non-transitory storage medium encoded with a computer readable program executed by a computer of an information processing apparatus capable of communicating data with another information processing apparatus through a server, the program causing the computer of the information processing apparatus to provides functionality comprising:
- a message acceptance which accepts input of a first message input by a user who operates the information processing apparatus;
- a message transmission which transmits the accepted first message and first character information to the server;
- a representation output which provides display, in chronological order, of a first character based on the first character information brought in correspondence with the first message, and a second message and a second character based on second character information, which have been input from another information processing apparatus and obtained through the server;
- the representation output also providing display of an emotional pattern of the character in correspondence with at least one of the first and second messages based on emotion data obtained as a result of an analysis of content of the at least one of the first and second messages, the analysis of the content of the at least one of the first and second messages including a division of the content into unit clauses and an analysis of the unit clauses to automatically set the emotion data for each of the clauses; and
- an audio output which provides audio output of the first message and the second message.

19. A method of controlling an information processing apparatus capable of communicating data with another information processing apparatus through a server, comprising the steps of:
- accepting input of a first message input by a user who operates the information processing apparatus;
- transmitting the accepted first message and first character information to the server;
- displaying in chronological order, a first character based on the first character information brought in correspondence with the first message, and a second message and a second character based on second character information, which have been input from another information processing apparatus and obtained through the server;
- displaying of an emotional pattern of the character in correspondence with at least one of the first and second messages based on emotion data obtained as a result of an analysis of content of the at least one of the first and second messages, the analysis of the content of the at least one of the first and second messages including a division of the content into unit clauses and an analysis of the unit clauses to automatically set the emotion data for each of the clauses; and
- providing audio output of the first message and the second message.

20. The information processing system according to claim 1, wherein the first information processing apparatus is further configured to perform:
- successively providing audio output of messages displayed in chronological order and showing, in an emphasized manner, the message of which audio output is being provided.

* * * * *